US008463612B1

(12) United States Patent
Neath et al.

(10) Patent No.: US 8,463,612 B1
(45) Date of Patent: Jun. 11, 2013

(54) MONITORING AND COLLECTION OF AUDIO EVENTS

(75) Inventors: Greg S. Neath, Orem, UT (US); John W. Rosenvall, Pleasant Grove, UT (US)

(73) Assignee: Raytheon Company, Waltham, MA (US)

( * ) Notice: Subject to any disclaimer, the term of this patent is extended or adjusted under 35 U.S.C. 154(b) by 1633 days.

(21) Appl. No.: 11/557,047

(22) Filed: Nov. 6, 2006

Related U.S. Application Data

(60) Provisional application No. 60/734,911, filed on Nov. 8, 2005, provisional application No. 60/734,886, filed on Nov. 8, 2005, provisional application No. 60/734,811, filed on Nov. 8, 2005, provisional application No. 60/734,909, filed on Nov. 8, 2005, provisional application No. 60/734,887, filed on Nov. 8, 2005, provisional application No. 60/734,812, filed on Nov. 8, 2005.

(51) Int. Cl.
*G01L 11/00* (2006.01)
*G01L 21/00* (2006.01)
*G01L 21/06* (2006.01)
*G06F 15/173* (2006.01)
*H04L 12/66* (2006.01)

(52) U.S. Cl.
USPC ........ 704/270; 704/270.1; 704/273; 704/275; 704/278; 370/352; 709/224

(58) Field of Classification Search
USPC .............. 704/270, 275, 270.1, 277, 273, 278; 370/352; 709/224; 713/176
See application file for complete search history.

(56) References Cited

U.S. PATENT DOCUMENTS

| 6,023,582 | A |   | 2/2000  | Rogers et al. ................. 395/708 |
| 6,099,317 | A |   | 8/2000  | Bullwinkel et al. ........... 434/118 |
| 6,105,064 | A | * | 8/2000  | Davis et al. .................... 709/224 |
| 6,487,709 | B1 | * | 11/2002 | Keller et al. ................... 716/117 |
| 6,529,954 | B1 |   | 3/2003  | Cookmeyer, II et al. ..... 709/224 |
| 6,543,011 | B1 |   | 4/2003  | Schumacher et al. .......... 714/45 |

(Continued)

FOREIGN PATENT DOCUMENTS

EP            1 389 862      *  8/2002

OTHER PUBLICATIONS

Van Blarcum, K. (2004). Passive VoIP Call Recording [White Paper], Retrieved from http://www.audiocodes.com/library/type=39591/page=1/search=passive%20voip%20call%20recording.*

(Continued)

*Primary Examiner* — Edgar Guerra-Erazo

(74) *Attorney, Agent, or Firm* — Daly, Crowley, Mofford & Durkee, LLP

(57) ABSTRACT

Various embodiments of the invention provide a facility for monitoring audio events on a computer, including without limitation voice conversations (which often are carried on a digital transport platform, such as VoIP and/or other technologies). In a set of embodiments, a system intercepts the audio streams that flow into and out of an application program on a monitored client computer, for instance by inserting an audio stream capture program between a monitored application and the function calls in the audio driver libraries used by the application program to handle the audio streams. In some cases, this intercept does not disrupt the normal operation of the application. Optionally, the audio stream capture program takes the input and output audio streams and passes them through audio mixer and audio compression programs to yield a condensed recording of the original conversation.

34 Claims, 8 Drawing Sheets

U.S. PATENT DOCUMENTS

| | | | | |
|---|---|---|---|---|
| 6,662,226 | B1 | 12/2003 | Wang et al. | 709/224 |
| 6,668,325 | B1 | 12/2003 | Collberg et al. | 713/194 |
| RE38,572 | E | 8/2004 | Tetro et al. | 235/380 |
| 6,772,107 | B1 | 8/2004 | La Cascia, Jr. et al. | 703/21 |
| 6,801,224 | B1 | 10/2004 | Lewallen | 345/746 |
| 6,832,367 | B1 | 12/2004 | Choi et al. | 717/130 |
| 6,976,218 | B2 | 12/2005 | Stanford-Clark | 715/744 |
| 6,996,068 | B1* | 2/2006 | Sherlock | 370/248 |
| 7,054,420 | B2* | 5/2006 | Barker et al. | 379/88.25 |
| 7,308,446 | B1 | 12/2007 | Panigrahy et al. | 707/6 |
| 7,418,733 | B2 | 8/2008 | Connary et al. | 726/25 |
| 7,661,036 | B1 | 2/2010 | Clingenpeel et al. | 714/47 |
| 7,702,959 | B2* | 4/2010 | Hwang et al. | 714/38.11 |
| 7,730,011 | B1 | 6/2010 | Deninger et al. | 707/3 |
| 2001/0040942 | A1* | 11/2001 | Glowny et al. | 379/88.22 |
| 2001/0043685 | A1* | 11/2001 | Bscheider et al. | 379/88.22 |
| 2002/0131369 | A1* | 9/2002 | Hasegawa et al. | 370/241 |
| 2003/0009418 | A1 | 1/2003 | Green et al. | 705/38 |
| 2003/0033545 | A1 | 2/2003 | Wenisch et al. | 713/202 |
| 2003/0053420 | A1 | 3/2003 | Duckett et al. | 370/252 |
| 2003/0074440 | A1 | 4/2003 | Grabarnik et al. | 709/224 |
| 2003/0101235 | A1 | 5/2003 | Zhang | 709/218 |
| 2003/0103645 | A1* | 6/2003 | Levy et al. | 382/100 |
| 2003/0123447 | A1 | 7/2003 | Smith | 370/394 |
| 2003/0190032 | A1* | 10/2003 | Ravishankar | 379/229 |
| 2003/0214943 | A1* | 11/2003 | Engstrom et al. | 370/353 |
| 2003/0216988 | A1 | 11/2003 | Mollett et al. | 705/35 |
| 2004/0083105 | A1* | 4/2004 | Jaroker | 704/260 |
| 2004/0111479 | A1* | 6/2004 | Borden et al. | 709/206 |
| 2004/0174996 | A1* | 9/2004 | Tewfik et al. | 380/44 |
| 2005/0060719 | A1 | 3/2005 | Gray et al. | 719/318 |
| 2005/0071760 | A1 | 3/2005 | Jaeger | 715/705 |
| 2005/0183143 | A1 | 8/2005 | Anderholm et al. | 726/22 |
| 2005/0222844 | A1* | 10/2005 | Kawahara et al. | 704/260 |
| 2006/0004581 | A1* | 1/2006 | Claudatos et al. | 704/275 |
| 2006/0004582 | A1* | 1/2006 | Claudatos et al. | 704/275 |
| 2006/0074623 | A1* | 4/2006 | Tankhiwale | 704/1 |
| 2006/0085691 | A1 | 4/2006 | Rivera et al. | 714/39 |
| 2006/0095569 | A1 | 5/2006 | O'Sullivan | 709/224 |
| 2006/0126817 | A1* | 6/2006 | Beckett et al. | 379/265.06 |
| 2006/0129627 | A1* | 6/2006 | Phillips et al. | 709/200 |
| 2006/0133595 | A1* | 6/2006 | Ravishankar | 379/229 |
| 2006/0149674 | A1 | 7/2006 | Cook et al. | 705/44 |
| 2006/0190489 | A1 | 8/2006 | Vohariwatt et al. | 707/104.1 |
| 2006/0203807 | A1* | 9/2006 | Kouretas et al. | 370/352 |
| 2006/0271827 | A1 | 11/2006 | Cascaval et al. | 714/39 |
| 2006/0282270 | A1 | 12/2006 | Sheets et al. | 705/1 |
| 2007/0027785 | A1 | 2/2007 | Lent et al. | 705/35 |
| 2007/0028297 | A1 | 2/2007 | Troyansky et al. | 726/2 |
| 2007/0050844 | A1 | 3/2007 | Lebel | 726/13 |
| 2007/0061456 | A1* | 3/2007 | Waris | 709/225 |
| 2007/0143455 | A1 | 6/2007 | Gorman et al. | 709/223 |
| 2008/0059198 | A1* | 3/2008 | Maislos et al. | 704/273 |

OTHER PUBLICATIONS

Fred Baker, Bill Foster, Chip Sharp, "Cisco Architecture for Lawful Intercept in IP Networks", IETF Standard-Working-Draft, Internet Engineering Task Force, Oct. 2003, pp. 1-16, ISSN: 0000-0004, XP015001052 7.*

Fred Baker, "Cisco Lawful Intercept Control MIB draft-baker-slem-mib-00", IETF Standard-Working-Draft, Internet -Draft, Internet Engineering Task Force, Apr. 2003, pp. 1-38, ISSN: 0000-0004, XP015000178.*

USPTO; *Office Action*, U.S. Appl. No. 11/556,942, filed Nov. 6, 2006, in the name of James E. Clingenpeel, (26 pgs), Notification Date Apr. 1, 2009.

USPTO; *Final Office Action*, U.S. Appl. No. 11/556,942, filed Nov. 6, 2006, in the name of James E. Clingenpeel, (28 pgs), Notification Date Nov. 9, 2009.

USPTO; *Office Action*, U.S. Appl. No. 11/556,942, filed Nov. 6, 2006, in the name of James E. Clingenpeel, (33 pgs), Notification Date Mar. 15, 2010.

USPTO; *Office Action*, U.S. Appl. No. 11/556,942, filed Nov. 6, 2006, in the name of James E. Clingenpeel, (35 pgs), Notification Date Aug. 17, 2010.

USPTO; *Office Action*, U.S. Appl. No. 11/556,968, filed Nov. 6, 2006, in the name of Brent E. Henry, (18 pgs), Notification Date Jun. 24, 2010.

USPTO; *Office Action*, U.S. Appl. No. 11/556,968, filed Nov. 6, 2006, in the name of Brent E. Henry, (12 pgs), Notification Date Dec. 8, 2010.

USPTO; *Office Action*, U.S. Appl. No. 11/557,007, filed Nov. 6, 2006, in the name of Brent E. Henry, (21 pgs), Notification Date Dec. 8, 2009.

USPTO; *Office Action*, U.S. Appl. No. 11/557,007, filed Nov. 6, 2006, in the name of Brent E. Henry, (21 pgs), Notification Date Jun. 11, 2010.

USPTO; *Office Action*, U.S. Appl. No. 11/557,007, filed Nov. 6, 2006, in the name of Brent E. Henry, (22 pgs), Notification Date Dec. 10, 2010.

USPTO; *Office Action*, U.S. Appl. No. 11/557,025, filed Nov. 6, 2006, in the name of James E. Clingenpeel, (7 pgs), Notification Date Mar. 18, 2009.

USPTO; *Notice of Allowance and Fee(s) Due* for U.S. Appl. No. 11/557,025, filed Nov. 6, 2006, in the name of James E. Clingenpeel, (4 pgs), Notification Date Sep. 1, 2009.

USPTO; *Office Action*, U.S. Appl. No. 11/556,984, filed Nov. 6, 2006, in the name of Michael Rogers, (33 pgs), Notification Date Aug. 4, 2010.

USPTO; *Office Action*, U.S. Appl. No. 11/556,984, filed Nov. 6, 2006, in the name of Michael Rogers, (32 pgs), Notification Date Feb. 24, 2010.

USPTO; *Final Office Action*, U.S. Appl. No. 11/556,984, filed Nov. 6, 2006, in the name of Michael Rogers, (28 pgs), Notification Date. May 14, 2009.

USPTO; *Office Action*, U.S. Appl. No. 11/556,984, filed Nov. 6, 2006, in the name of Michael Rogers, (27 pgs), Notification Date Sep. 4, 2008.

USPTO; *Office Action*, U.S. Appl. No. 11/556,984, filed Nov. 6, 2006, in the name of Michael Rogers, (40 pgs), Notification Date Dec. 27, 2010.

USPTO; *Final Office Action*, U.S. Appl. No. 11/556,942, filed Nov. 6, 2006, in the name of James E. Clingenpeel, mailed Feb. 15, 2011 (34 pgs).

USPTO; *Final Office Action*, U.S. Appl. No. 11/556,942, filed Nov. 6, 2006, in the name of James E. Clingenpeel, mailed May 12, 2011 (39 pgs).

USPTO; *Advisory Action*, U.S. Appl. No. 11/556,968, filed Nov. 6, 2006, in the name of Brent E. Henry, mailed Feb. 25, 2011 (3 pgs).

USPTO; *Advisory Action*, U.S. Appl. No. 11/556,984, filed Nov. 6, 2006, in the name of Michael Rogers, mailed Mar. 16, 2011 (3 pgs).

USPTO; *Final Office Action*, U.S. Appl. No. 11/557,007, filed Nov. 6, 2006, in the name of Brent E. Henry, mailed Jul. 8, 2011 (30 pgs).

James E. Clingenpeel, U.S. Appl. No. 11/556,942, Response to 37. C.F.R. § 1.111 (21 pgs), Aug. 12, 2011.

Brent E. Henry, U.S. Appl. No. 11/556,968, "Appeal Brief" (122 pgs) Jul. 27, 2011.

Brent E. Henry, U.S. Appl. No. 11/557,007, "Response to 37 C.F.R. § 1.111", filed Oct. 10, 2011 (16 pages).

* cited by examiner

MONITORING AND COLLECTION OF AUDIO EVENTS

CROSS-REFERENCE TO RELATED APPLICATIONS

The present disclosure may be related to the following commonly assigned applications/patents:

This application claims priority from commonly-assigned provisional U.S. Patent Application No. 60/734,911, entitled "Monitoring and Collection of Audio Events," and filed Nov. 8, 2005 by Neath et al.

This application is related to commonly-assigned U.S. patent application Ser. No. 11/556,942, entitled "Event Monitoring and Collection," and filed on a date even herewith by Clingenpeel et al., which claims priority from provisional U.S. Patent Application No. 60/734,886, entitled "Event Monitoring and Collection," and filed Nov. 8, 2005 by Clingenpeel et al.

This application is related to commonly-assigned U.S. patent application Ser. No. 11/556,968, entitled "Replaying Events Collected from a Client Computer," and filed on a date even herewith by Henry, which claims priority from provisional U.S. Patent Application No. 60/734,811, entitled "Replaying Events Collected from a Client Computer," and filed Nov. 8, 2005 by Henry.

This application is related to commonly-assigned U.S. patent application Ser. No. 11/557,007, entitled "Keyword Obfuscation," and filed on a date even herewith by Henry et al., which claims priority from provisional U.S. Patent Application No. 60/734,909, entitled "Keyword Obfuscation," and filed Nov. 8, 2005 by Henry et al.

This application is related to commonly-assigned U.S. patent application Ser. No. 11/557,025, entitled "Cache for Collecting Events on a Monitored Computer," and filed on a date even herewith by Clingenpeel et al., which claims priority from provisional U.S. Patent Application No. 60/734,887, entitled "Cache for Collecting Events on a Monitored Computer," and filed Nov. 8, 2005 by Clingenpeel et al.

This application is related to commonly-assigned U.S. patent application Ser. No. 11/556,984, entitled "Validation of Social Security Numbers," and filed on a date even herewith by Rogers, which claims priority from provisional U.S. Patent Application No. 60/734,812, entitled "Validation of Social Security Numbers," and filed Nov. 8, 2005 by Rogers.

The respective disclosures of these applications/patents are incorporated herein by reference in their entirety for all purposes.

FIELD OF THE INVENTION

The present invention relates to computer systems in general and in particular to the monitoring of audio events on computer systems.

BACKGROUND OF THE INVENTION

Traditionally, phone calls and other audio conversations have been monitored for a variety of reasons. For instance, law enforcement authorities commonly monitor telephone calls using wiretaps and other similar technologies in the course of investigating criminal activity. There are many civilian uses of audio monitoring as well. Merely by way of example, many organizations wish to monitor sales and/or support calls in which their employees participate, for a variety of purposes, including training, verification, and supervision.

The public internet now provides sufficient bandwidth and responsiveness to support voice conversations using a variety of desktop applications installed on a client workstation. Multiple application programs are now able to conduct telephone-like or instant voice message communications over the public internet. These applications use a variety of encoding techniques for the transport of the audio streams.

The applications range from voice-enabled instant message applications, such as instant messenger applications, to soft-phone telephone replacement applications that provide a telephone infrastructure over the public internet using the internet protocol as the transport. Voice over Internet Protocol ("VoIP") is but one well-known technology enabling such applications. In many cases, these applications include encryption technology, such that audio data is digitized and encrypted before transport between computers.

Traditional monitoring methods often are unable to accommodate these digital communications and, in particular, the increasing use of computer applications to support those communications.

BRIEF SUMMARY OF THE INVENTION

Various embodiments of the invention provide a facility for monitoring audio events on a computer, including without limitation voice conversations (which often are carried on a digital transport platform, such as VoIP and/or other technologies). In a set of embodiments, a system intercepts the audio streams that flow into and out of an application program on a monitored client computer, for instance by inserting an audio stream capture program between a monitored application and the function calls in the audio driver libraries used by the application program to handle the audio streams. Merely by way of example, in some cases, the audio stream capture program takes a copy of each audio data stream and passes the audio stream content on to its original destination function, creating a non-disruptive audio stream intercept. Optionally, the audio stream capture program takes the input and output audio streams and passes them through audio mixer and audio compression programs to yield a condensed recording of the original conversation.

One set of embodiments provides systems for monitoring audio events, including without limitation voice conversations, on a monitored client computer. Some systems, for example, might implement methods of the invention and/or execute software programs of the invention. An exemplary system in accordance with certain embodiments can be used on a monitored computer system comprising a processor, an audio input device, an audio output device, a device driver providing an application programming interface ("API") for the audio input device and the audio output device, and a Voice over Internet Protocol ("VoIP") application for handling voice conversations using the computer system. The exemplary system comprises, in some embodiments, an audio stream capture component, an audio mixer component, and/or an audio storage component.

In some embodiments, the audio stream capture component comprises a first set of instructions executable by the processor. The first set of instructions might comprise instructions to identify an audio input buffer for the VoIP application; in some cases, the audio input buffer is configured to hold audio data received (e.g., via the API) from the audio input device. The first set of instructions, in some cases, comprises further instructions to identify an audio output buffer for the VoIP application; the audio output buffer might be configured to hold audio data to be provided (e.g., via the API) to the audio output device.

The audio stream capture component might further include instructions to intercept a first function call from the VoIP application to the API. In some cases, the first function call informs the API that the VoIP application has processed a first set of data at the audio input buffer, the first set of data representing an audio input stream for the VoIP application. There might, then, be instructions to capture the first set of data and/or to propagate the first function call for reception by the API.

In certain embodiments, the audio capture component further comprises instructions to intercept a second function call from the VoIP application to the API; the second function call might comprise information about a second set of data comprising an audio output stream from the VoIP application. (Merely by way of example, the information about the second set of data might provide a reference to a location of an audio output buffer where the second set of data is stored and/or might comprise the second set of data itself.) The audio capture component might also capture this second set of data (e.g., from the audio output buffer) and/or propagate the second function call for reception by the API. In a particular embodiment, the audio capture program comprises instructions to transmit the first set of data and the second set of data for reception by the audio mixer component.

The audio mixer component, in some embodiments, comprises a second set of instructions executable by the processor. The second set of instructions might include instructions to receive the first and/or second sets of data. In some cases, the second set of instructions includes instructions to synchronize the first set of data with the second set of data to re-create a voice conversation handled by the VOIP application.

The audio storage component might comprise a third set of instructions executable by the processor. The third set of instructions can include, inter alia, instructions to compress the re-created voice conversation and/or instructions to save the re-created voice conversation to a storage medium. In some cases, the third set of instructions further comprises instructions to transmit the re-created voice conversation for reception by a monitoring server.

Another exemplary system might be implemented in a monitored computer system comprising a processor, an audio input device, an audio output device, a device driver providing an application programming interface ("API") for the audio input device and the audio output device, and an audio application that receives audio input and provides output. The exemplary system, in some embodiments, is configured to monitor audio streams handled by the audio application. The system might comprise a software application running on the computer system, the software application comprising a set of instructions executable by the processor.

The set of instructions comprises, in a set of embodiments, instructions to intercept a first function call from the audio application to the API. (In some cases, the first function call comprises information about a first set of data representing an audio input stream for the audio application). The software application might further comprise instructions to capture the first set of data and/or instructions to propagate the first function call for reception by the API.

In some cases, the software application comprises further instructions to intercept a second function call from the audio application to the API; the second function call might include information about a second set of data representing an audio output stream from the audio application. Hence, the software application might comprise instructions to capture the second set of data and/or instructions to propagate the second function call for reception by the API. In some cases, the software application further comprises instructions to synchronize the first set of data with the second set of data to re-create an set of audio input and output streams handled by the audio application. In some cases, the audio input and output streams are isochronous.

In certain embodiments, the software application further comprises instructions to identify an audio input buffer for the audio application. The audio input buffer might be configured to hold audio data received from the audio input device. In some cases, this buffer can be identified by intercepting an initial function call from the audio application to the API. (For example, the initial function call might reference the audio input buffer.) In some cases, the first function call informs the API that the audio application has processed a first set of data at the input buffer. Hence, in a set of embodiments, capturing the first set of data might comprise obtaining the first set of data from the audio input buffer for the audio application.

In some cases, the software application provides additional functionality. Merely by way of example, in a set of embodiments, the software application comprises further instructions to compress the re-created set of audio input and output streams and/or to save the re-created set of audio input and output streams to a storage medium. In other embodiments, the software application comprises instructions to transmit the re-created set of audio input and output streams for reception by a monitoring server.

In a particular set of embodiments, the audio application might be a VoIP application and/or the re-created set of audio input and output streams might comprise a VoIP conversation.

Another set of embodiments provides methods, including without limitation methods that can be implemented on systems of the invention. An exemplary method, for example, might be implemented on a computer system comprising an audio device, a device driver providing an API for the audio device, and an audio application configured to provide audio services. The method, then, might be used for monitoring an audio stream handled by the audio application.

In a set of embodiments, the method comprises intercepting a function call from the audio application to the API, the function call comprising information about a set of data representing an audio stream handled by the audio application, capturing the set of data; propagating the function call for reception by the API, and/or re-creating the audio stream from the captured set of data. In some cases, the method might further comprise compressing the re-created audio stream, saving the re-created audio stream to a storage medium and/or transmitting the re-created audio stream for reception by a monitoring server.

In some cases, the audio device comprises an audio output device. In such cases, the function call might comprise a reference to an audio output buffer storing the set of data. In a other cases, the audio device comprises an audio input device. Hence, the function call might inform the API that the audio application has processed the set of data at an audio input buffer. The method then, might comprise identifying an audio input buffer for the audio application, the audio input buffer being configured to hold audio data received via the API from the audio input device. Accordingly, capturing the set of data might comprise, in some cases, obtaining the set of data from the audio input buffer.

In other embodiments, the audio device comprises both an audio input device and an audio output device. In such cases, the method might further comprise intercepting a second function call from the audio application to the API (the second function call may comprise a second set of data representing an audio output stream from the audio application) and/or capturing the second set of data. In some cases, the method might also comprise propagating the second function call for reception by the API. In some cases, the set of data may be synchronized with the second set of data, for instance, to re-create an audio input-output stream handled by the audio application. The audio input-output stream may be isochronous and/or may comprise a Voice over Internet Protocol ("VoIP") conversation handled by the audio application.

Yet another set of embodiments provides software programs, including without limitation software programs comprising instructions to perform methods of the invention and/ or software programs executable on systems of the invention. An exemplary software program might be configured for use on a computer system comprising a processor, an audio input device, an audio output device, a device driver providing an application programming interface ("API") for the audio input device and the audio output device, and an audio application that receives audio input and provides audio output. The software program, in an embodiment, comprises a set of instructions executable by the processor.

The set of instructions comprises, in a set of embodiments, instructions to intercept a first function call from the audio application to the API. (In some cases, the first function call comprises information about a first set of data representing an audio input stream for the audio application). The software application might further comprise instructions to capture the first set of data and/or instructions to propagate the first function call for reception by the API.

In some cases, the software application comprises further instructions to intercept a second function call from the audio application to the API; the second function call might information about a second set of data representing an audio output stream from the audio application. Hence, the software application might comprise instructions to capture the second set of data and/or instructions to propagate the second function call for reception by the API. In some cases, the software application further comprises instructions to synchronize the first set of data with the second set of data to re-create an set of audio input and output streams handled by the audio application.

BRIEF DESCRIPTION OF THE DRAWINGS

A further understanding of the nature and advantages of the present invention may be realized by reference to the remaining portions of the specification and the drawings wherein like reference numerals are used throughout the several drawings to refer to similar components. In some instances, a sublabel is associated with a reference numeral to denote one of multiple similar components. When reference is made to a reference numeral without specification to an existing sublabel, it is intended to refer to all such multiple similar components.

DETAILED DESCRIPTION OF THE INVENTION

Figure 1:
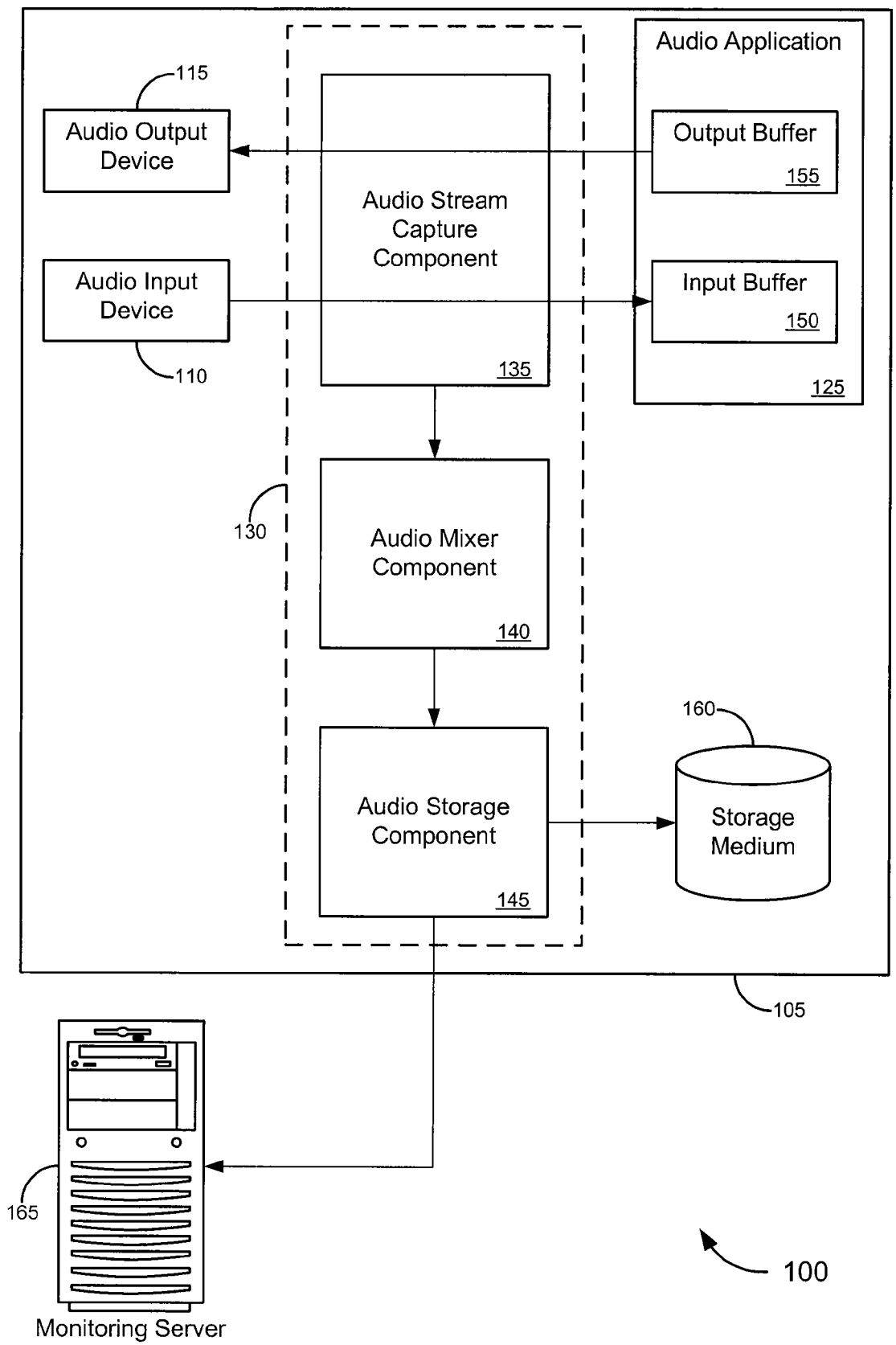
FIG. 1 is generalized schematic diagram illustrating a system for monitoring and/or collecting audio events, in accordance with various embodiments of the invention.

An improved solution is provided herein for monitoring audio events on a computer, including without limitation voice conversations (which often are carried on a digital transport platform, such as VoIP and/or other technologies). In a set of embodiments, a system intercepts the audio streams that flow into and out of an application program on a monitored client computer, for instance by inserting an audio stream capture program between a monitored application and the function calls in the audio driver libraries used by the application program to handle the audio streams. Merely by way of example, in some cases, the audio stream capture program takes a copy of each audio data stream and passes the audio stream content on to its original destination function, creating a non-disruptive audio stream intercept. Optionally, the audio stream capture program takes the input and output audio streams and passes them through audio mixer and audio compression programs to yield a condensed recording of the original conversation.

According to an aspect of the invention, the functionality of some embodiments to capture audio data between the application and the hardware provides the ability to monitor audio events (such as voice conversations, audio data recorded by an application from a microphone at the monitored computer, audio data received from another source, just to name a few examples), even if the application encrypts and/or otherwise attempts protects the data from monitoring. This is because the device driver generally is able to process only raw data (that is, to provide raw data as input to the application and/or to accept raw data as output from the application). Hence, by intercepting data traffic between the device driver and the application (and/or obtaining data from the application in the form it was provided by the device driver), embodiments of the invention provide the ability to use access and/or use such data before the application has the ability to apply any protection schemes to the data (or, in the case of output from the application, after such protection schemes have been removed by the application).

For example, in a set of embodiments, the sound card or audio chipset in a monitored computer accessed via the services of an operating system driver that presents a consistent interface to the operating system. An application wishing to make use of the capabilities of the installed audio peripherals does so by establishing access to these audio peripherals using the standardized and predictable application programming interface presented by operating system's multimedia system.

By tapping into this standard interface between the application program and the operating system's multimedia system (and/or the device driver(s) for the device(s)), embodiments of the invention enable the collection of the input and/or output audio streams that flow between the audio driver and the application program. In some cases, the input and output audio streams are then combined by passing them to an audio mixer, which may produce a combined audio stream that represents the conversation being conducted by the user using the application program. The input and/or output audio streams (which may, as noted above, be incorporated in a combined input and output stream) produced by the audio mixer might be fed into an audio compression routine that creates an MP3, WAV or similar compressed output format, which then may be saved as a record of the conversation that flowed into and out of the monitored application.

In certain embodiments, because any audio-enabled application may be forced (by the computer's operating system) to interact with the computer's installed audio system through a predictable set of input and output APIs, the audio capture process may be designed to be independent of the nature of the audio-enabled application; the audio-enabled application can be, to name but a few examples, a soft-phone and/or VoIP application, a voice-enabled instant message program, a media player and/or recorder, and/or any other audio-enabled application program. The audio-capture method may be, in some embodiments, completely independent of the nature of the application.

FIG. 1 illustrates a system 100 that can be used to provide the audio monitoring and/or capture functionality in accordance with one set of embodiments. The system 100 comprises (and/or can be used on) a monitored computer system 105 comprising a processor (not shown on FIG. 1), an audio input device 110 (such as a microphone interface, audio capture device, etc.), and an audio output device 115 (such as a sound card, etc.). (It should be noted that in, some cases a single device (e.g., a card, chipset, etc.) can provide the functionality of both the audio input device 110 and the audio output device 115). The computer 115 might further comprise a device driver (not shown on FIG. 1), which might provide an application programming interface ("API") for the audio input device 110 and/or the audio output device 115. The computer 105 also includes an a audio application 125, which may generate one or more audio events that can be monitored by the system 100. (In the description of FIG. 1, the audio application 125 is described, for purposes of illustration, as a VoIP application for handling voice conversations using the computer 105. It should be noted, however that the audio application 125, in various embodiments, can be any application that handles one or more audio input and/or output streams.)

The exemplary system 100 also comprises a software program 130 that is configured to monitor and/or capture audio streams. In some embodiments, an audio stream capture component 135, an audio mixer component 140, and/or an audio storage component 145. (It should be noted that, while the description of the software program 130 refers to these components, the organization of the functionality of these components may vary according to the embodiments. Merely by way of example, in some cases, the functionality one or more of the components may be consolidated within a single component, and/or the functionality of a component may be divided among a plurality of components.)

In a set of embodiments, the audio stream capture component 135 comprises a first set of instructions executable by the processor. The first set of instructions might comprise instructions to identify (e.g., by memory location, etc.) an audio input buffer 150 for the VoIP application 125. This input buffer 150 might serve as a buffer for the VoIP application to store data (such as an audio stream captured by a microphone, etc.) received from the audio input device 110 (e.g. via an API and/or multimedia dll, as described in more detail below). The first set of instructions, in some cases, comprises further instructions to identify an audio output buffer 155 of the application; the audio output buffer might 155 be configured to hold audio data to be provided (e.g., via the API and/or a multimedia dll) to the audio output device (e.g., to be played through a speaker, etc.).

The audio stream capture component 135 might further include instructions intercept a first function call from the VoIP application 125 to the API. In some cases, the first function call informs the API that the VoIP application has processed a first set of data at the input buffer 150. This first set of data may represent an audio input stream for the VoIP application 125. There might, then, be instructions to capture the first set of data and/or to propagate the first function call for reception by the API. (By propagating the function call to the API, the capture component 135 can avoid disrupting the operation of the VoIP application 125 and therefore can avoid detection by a user of the VoIP application 125, in accordance with some embodiments).

In certain embodiments, the audio capture component 135 further comprises instructions to intercept a second function call from the VoIP application 125 to the API; the second function call might comprise information about a second set of data comprising and/or representing an audio output stream from the VoIP application 125. (Merely by way of example, the information about the second set of data might comprise a location of the output buffer 155, so that the API and/or a multimedia dll—which might comprise the API— can obtain the second set of data (comprising the audio output stream) at the output buffer. In other cases, the second set of data might comprise the output stream itself). Hence, in some cases, there may be instructions to identify the audio output buffer 155. The audio stream capture component 135 might also capture the audio output stream (from the buffer, from the second function call, etc.) and/or propagate the second function call for reception by the API. In a particular embodiment, the audio capture component 135 comprises instructions to transmit the first set of data and/or the second set of data for reception by the audio mixer component 140.

The audio mixer component 140, in some embodiments, comprises a second set of instructions executable by the processor. The second set of instructions might include instructions to receive the first and/or second sets of data (e.g., from the audio stream capture component 135). In some cases, the second set of instructions includes instructions to instructions to synchronize the first set of data with the second set of data to re-create a voice conversation handled by the VOIP application.

The audio storage component 145 might comprise a third set of instructions executable by the processor. The third set of instructions can include, inter alia, instructions to compress the re-created voice conversation and/or instructions to save the re-created voice conversation to a storage medium 155. In some cases, the third set of instructions further comprises instructions to transmit the re-created voice conversation for reception by a monitoring server 165. Merely by way of example, as described in more detail below, in a set of embodiments, the system 100 may be used in a monitoring system, and/or captured audio events (including without limitation captured conversations, input data to an audio application and/or output data from an audio application) may be transmitted to a monitoring server 165 for analysis and/or replay.

Figure 2:
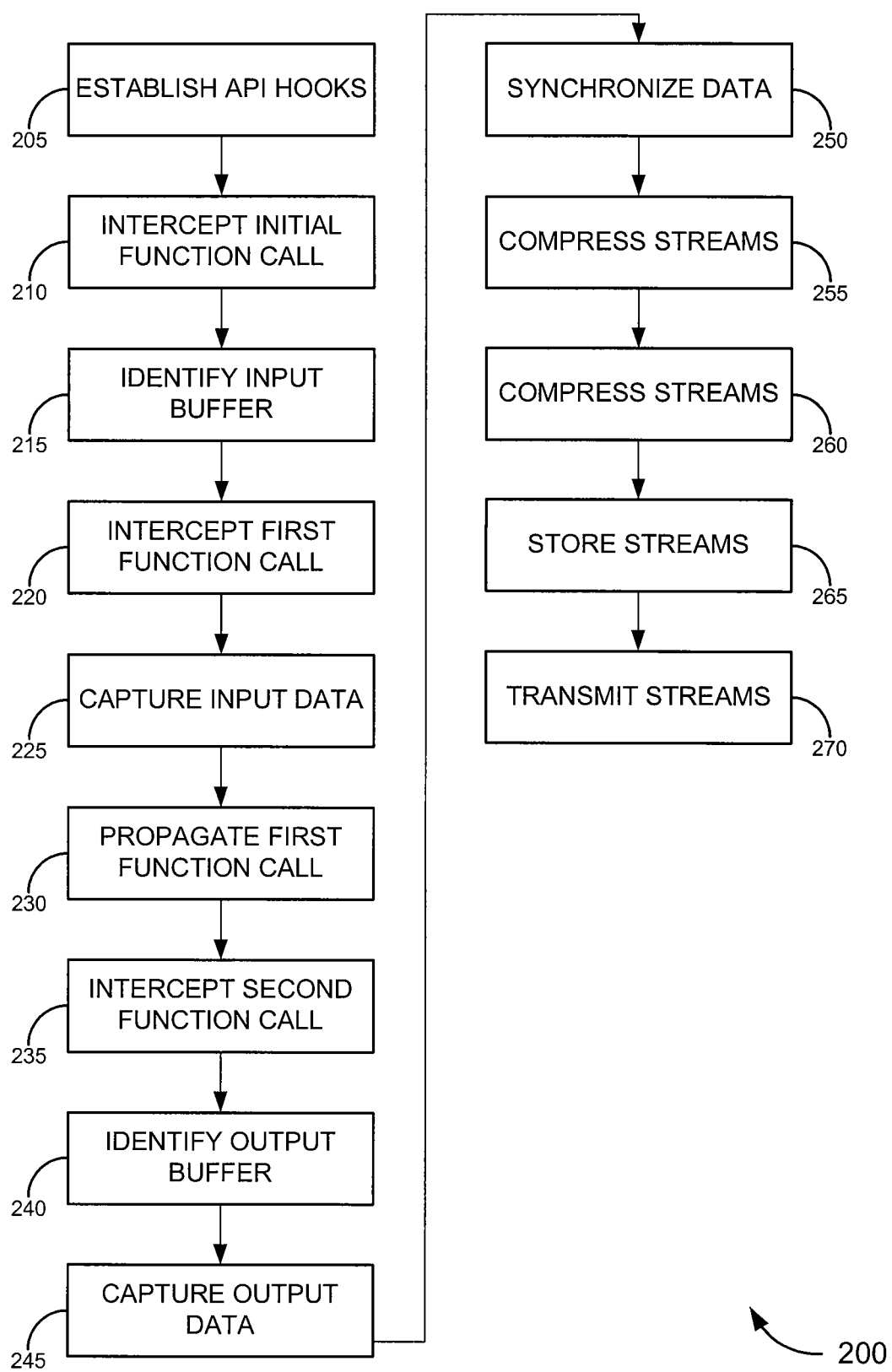
FIG. 2 is a process flow diagram illustrating a method of monitoring and/or collecting audio events, in accordance with various embodiments of the invention.

FIG. 2 illustrates a method 200 in accordance with certain embodiments of the invention. The method 200 may be implemented by a system similar to the system 100 described above and/or by any other appropriate hardware and/or software configuration. In particular, the method 200 may be implemented by a software program configured to perform the procedures of the method 200.

The method 200 generally may comprise capturing one or more sets of input and/or output data from an audio application. In some cases, the data may be captured from function calls from the audio application to a device driver (and/or an API thereof). In another set of embodiments, however, capturing input data can comprise capturing data from one or more buffers used by the audio application, perhaps based on information received from one or more function calls between an audio application and a device driver. In a set of embodiments, for example, capturing the input data may comprise obtaining the input data from a memory address (e.g., a buffer) used by the audio application to store input data, after the data has been processed by the audio application but before it has been purged by the device driver's API (and/or by a multimedia dll, which might comprise the API). Similarly, output data may be captured from an audio output buffer, based perhaps on a function call informing the device driver's API (and/or multimedia dll) that an audio stream is available at the output buffer.

This procedure may be used, in some cases, because the audio streams themselves might not ever be transmitted in a function call that can be intercepted. Rather, in many operating systems, the audio application provides (e.g., via function call) a memory address for a buffer at which such information should be stored (for input) or can be obtained (for output), and the device driver (and/or an API for the driver and/or a multimedia dll) writes the data directly to (and/or obtains the data directly from) the memory address. In some cases, a multimedia dll provides the API for the driver. In other cases, a multimedia dll might intermediate between the audio application and the driver's API.

Hence, in a set of embodiments, the method might comprise establishing a set of API hooks (block 205), which can allow the monitoring application (and/or an audio capture component thereof) to intercept calls between one or more audio device drivers (and/or a multimedia dll providing access to those drivers), as described with respect to FIG. 5, below, for example. The method 200 may further comprise intercepting an initial function call from the application to the device driver (and/or an API provided by the driver and/or a multimedia dll) (block 210). Although the term "initial function call" is used herein, the term "initial" is not meant necessarily to convey that the function call is the very first function call made by the application. Instead, the term "initial function call" is used to mean an initialization call in which the application provides to the device driver the memory address of its input buffer. Based perhaps on this initial function call, then, the audio input buffer (and/or the location in memory thereof) for the application can be identified (block 215).

At block 220, the monitoring application (and/or a component thereof) might intercept a first function call from the audio application to the device driver. (The term "first" is used here merely as a nominative and should not be interpreted as implying a chronological order. As noted above, the initial function call generally will occur prior in time to the first function call, since it may be required in order for the driver to know where to store the input data.) The first function call, in many cases, serves to inform the driver that the audio application has processed the input data at the input buffer, such that the audio application is ready for the buffer to be purged and for more input data (if available) to be stored at that location. By intercepting this call, the monitoring application can access the memory location (which may have been identified, as described above, from an initial function call), and capture the input data stored there (block 225) before the data is replaced by the driver with new data. (Other procedures may be used to capture the input data. Merely by way of example, in some cases, if the input data is provided from the driver (and/or a multimedia dll) in a data stream to the audio application, that data stream might be intercepted, using a technique similar to the API hooks described below.)

The first function call also may be propagated to the device driver (block 230), so that, for example, the interaction between the audio application and the driver can continue without interference. In some cases, a second function call from the application to the device driver can be intercepted (block 235). (Once again, the term "second" is used here merely as a nominative and should not be interpreted as implying a chronological order. Indeed, in some cases, the interception of the second function call may occur prior in time to the interception of the initial and/or first function calls.) This second function call generally will comprise information about a set of data comprising an audio output stream from the audio application. (Merely by way of example, in some cases, the second function call will provide a reference to an audio output buffer of the audio application, where the device driver (and/or a multimedia dll) can access the audio output stream. In other embodiments, the second function might actually comprise the audio output stream.)

In some embodiments, then the method can comprise identifying an audio output buffer (block 240), based perhaps on information from the second function call. The second set of data (which, again, might comprise the audio output stream) may then be captured (block 245), e.g., from the buffer identified by the second function call and/or from the call itself.

The procedures used to capture input data and output data (collectively including some or all of blocks 205-245) can be repeated as needed to capture multiple sets of input and/or output data from the audio application. At some point (for example, based on time and/or data size threshold, and/or when the application stops making function calls for a period of time, is closed, etc.) the data sets may be synchronized (block 250) as appropriate. This synchronization can function to re-create a set of bi-directional audio streams (such as a voice conversation, to cite but one example). In a set of embodiments, the input and output data together may comprise a set of isochronous audio streams, such that synchronizing the data sets comprises ensuing that the timing of the re-created streams is consistent with the timing of the original audio streams (e.g., conversation), allowing for accurate replay of the streams together. The synchronization process, in some embodiments, may combine one or more input streams and/or one or more output streams into a single, isochronous stream.

In accordance with some embodiments, the audio streams (and/or combined audio stream) may be compressed (block 260), using any suitable compression algorithm. Merely by way of example, in a set of embodiment, the audio stream(s) output from an audio mixer may be streamed into a audio compression process, which samples and compresses the audio stream, producing a compressed audio stream which is formatted into any suitable audio file format (such as MP3, WAV, etc.).

Further, the stream(s) may be stored at a storage medium, which may be local to the monitored computer and/or remote from the monitored computer (block 265). Merely by way of example, in a set of embodiments, storing an audio stream may comprise storing the stream at a location accessible with a network (which might be the Internet). In a particular set of embodiments, one or more audio streams may be transmitted (block 270), e.g., to a monitoring server for analysis and/or replay.

Merely by way of example, in some cases, the monitoring application may be part of a monitoring system, such as the systems described in U.S. patent application Ser. Nos. 11/556,968, 11/556,968, 11/557,007, 11/557,025, 11/556,984, each of which is already incorporated by reference, as well as other monitoring systems.

Figure 3:
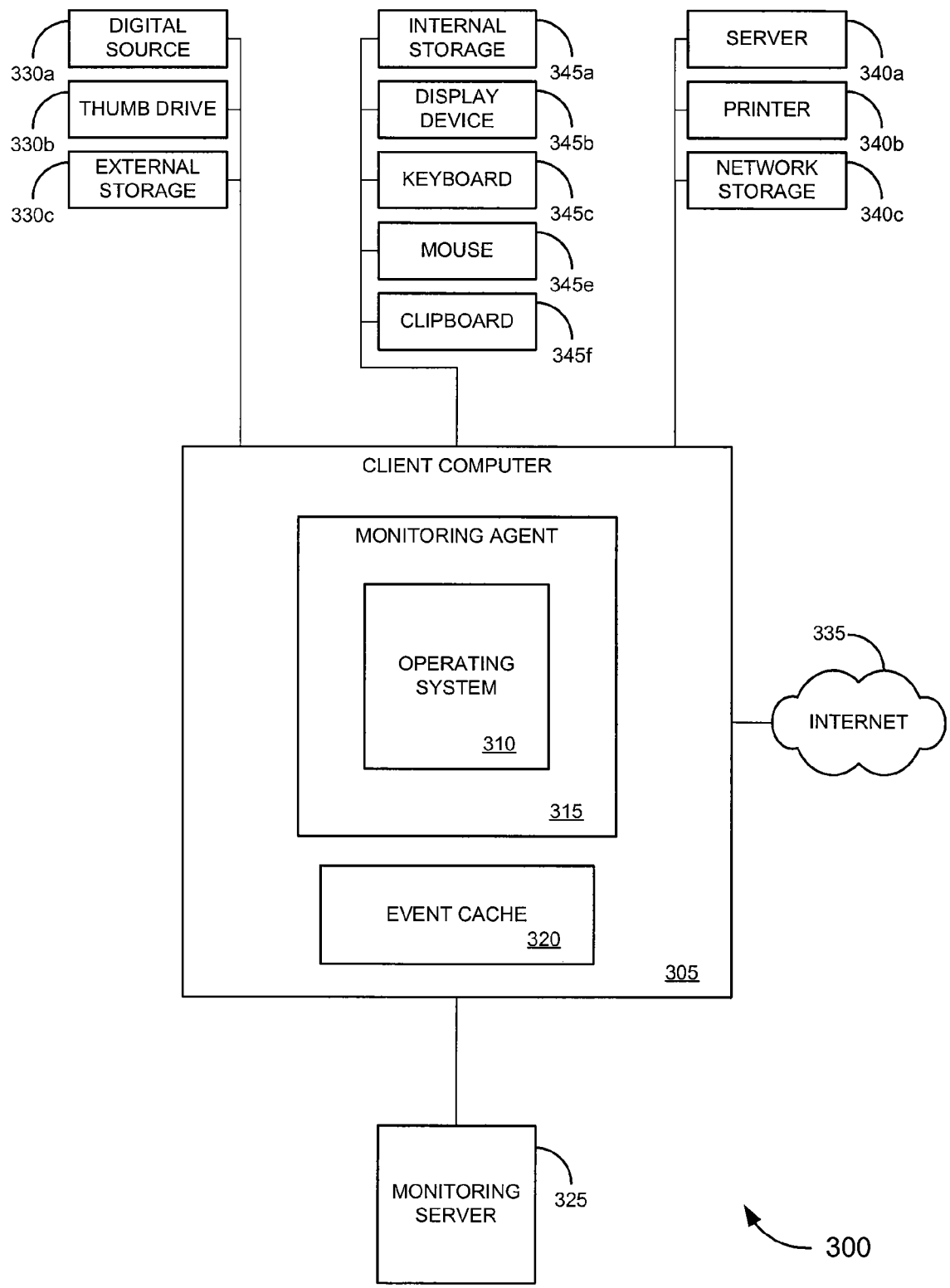
FIG. 3 is generalized schematic diagram illustrating a system for monitoring events on a monitored computer, in accordance with various embodiments of the invention.

For instance, FIG. 3 illustrates an exemplary system 300 for monitoring a computer. The system 300 comprises a client computer 305 (also referred to herein as a "monitored computer"), which comprises an operating system 310. The operating system 310 can be virtually any operating system, including without limitation any of the various varieties of Microsoft Windows™, Apple Macintosh OS™, UNIX™ (and/or any derivative operating systems, such as BSD, Linux, etc.) and/or the like. The client 305 also comprises an event monitoring agent 315; the event monitoring agent is capable of monitoring, analyzing and/or collecting events in accordance with methods of the invention, as described in further detail below. A monitoring agent may comprise a plurality of functional components, including without limitation the components described with respect to FIGS. 1 and 2 herein, as well as, in some cases, those described in detail in U.S. patent application Ser. No. 11/557,025, already incorporated by reference. (It should be noted, however, that the structural organization of the monitoring agent is discretionary and can vary according to different embodiments of the invention.)

In a set of embodiments, the monitoring agent may store in an event cache 320, as described in more detail below, the content and context of some or all events that are generated by a user (and/or by the operating system 310, an application program, etc.) when utilizing the monitored client computer 305. In particular, the event cache may be used to store representations of audio events (including without limitation audio input and/or output data from an audio application, as well as re-created audio streams based on such data). At certain times (but possibly not always), the client 305 may be in communication with a monitoring server computer 325, which can be in communication with the event cache 320 and/or the monitoring agent 315, although such communications may not be apparent to the user of the client 305, as described elsewhere herein. The monitoring server computer 325 may comprise any appropriate operating system, including without limitation those described above, as well as monitoring server application, which interacts with the monitoring agent 315 and/or event cache 320. The monitoring server may provide other services as well, including without limitation an event replay service, as described more fully in U.S. patent application Ser. No. 11/556,968, already incorporated by reference. Hence, in some embodiments, a replay workstation may be used to replay captured audio events and/or streams. In a set of embodiments, the monitoring server 325 communicates with the client 305 using an IP-based connection (such as via the Internet 335, etc.).

The client 305 may also be in communication with a variety of devices, including without limitation locally-connected devices 330 (including, merely by way of example, digital sources 330a such as cameras, etc., thumb drives 330b and other transient storage devices, and external hard drives 330c), network connections to the Internet 335 (and/or other online services, WANs and/or the like), LAN resources 340 (such as network servers 340a, printers 340b and/or network storage 340c, to name but a few examples). In addition, the client 305 may comprise (and/or be in communication with) a variety of local devices (both physical and virtual) 345, such as internal storage 345a, display devices 345b, input devices (such as a keyboard 345d and/or mouse 345e, as well as audio input devices described herein, to name a few examples), output devices (including without limitation audio output devices described herein), and/or a clipboard 345f (which can be used to hold data cut and/or copied from an application or the operating system 310).

Figure 4:
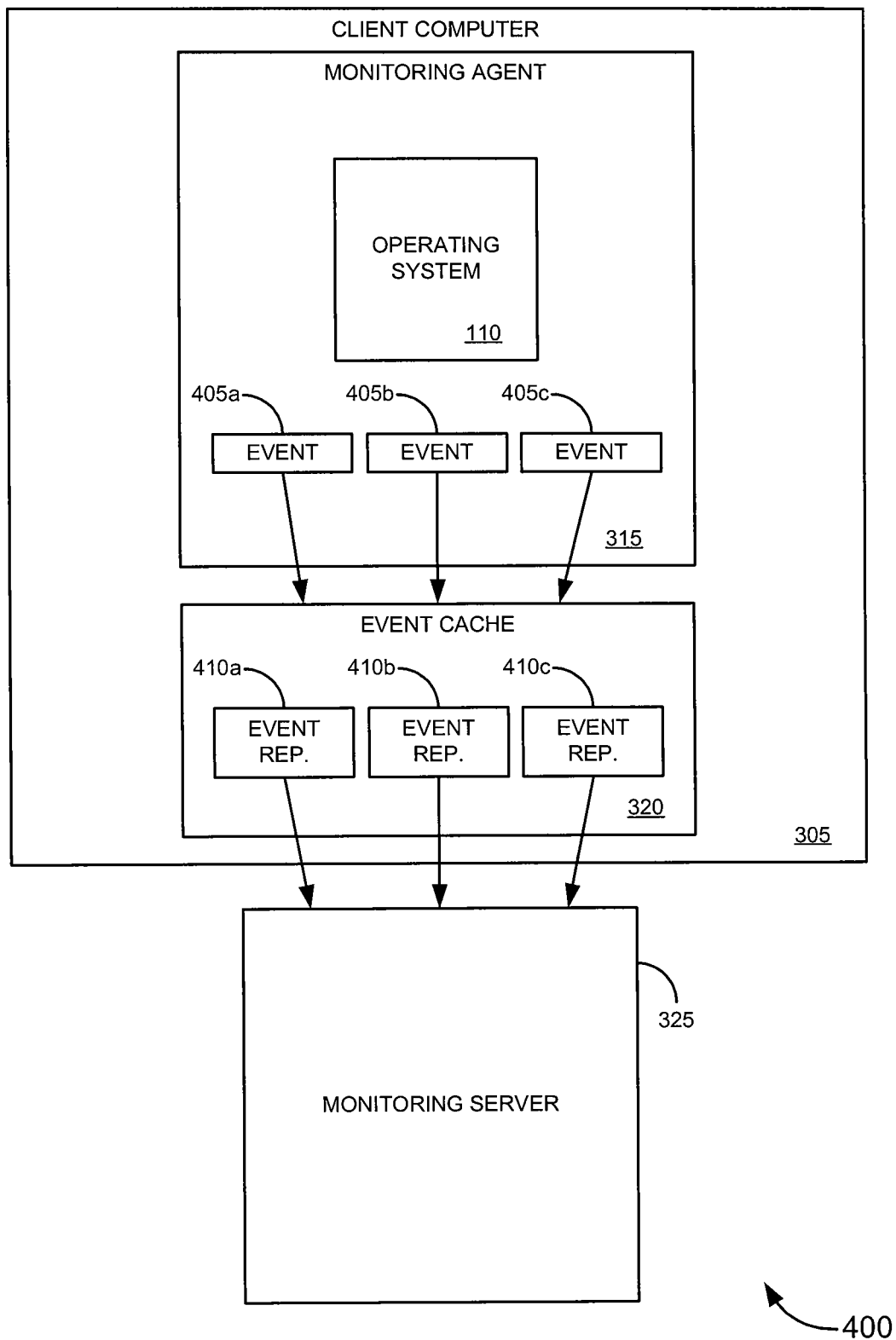
FIG. 4 is generalized schematic diagram illustrating the collection of events on the system of FIG. 3.

As illustrated by FIG. 4, in some embodiments, the monitoring agent 315 is configured to capture selected events 405 (which can include audio events, in accordance with embodiments of the invention) occurring at the client 305. Representations 410 of captured events 405 then may be stored at the event cache 320. (As described below, in some cases, a representation 310a of a particular event 305a may comprise a hash computed from a set of rich data (including, for example, audio data, associated with the event.) The stored representations 410 of the events 405 then can be transferred to the monitoring server 325 when connectivity is established between the monitoring server 325 and the client 305 (and/or at another appropriate time).

Figure 5:
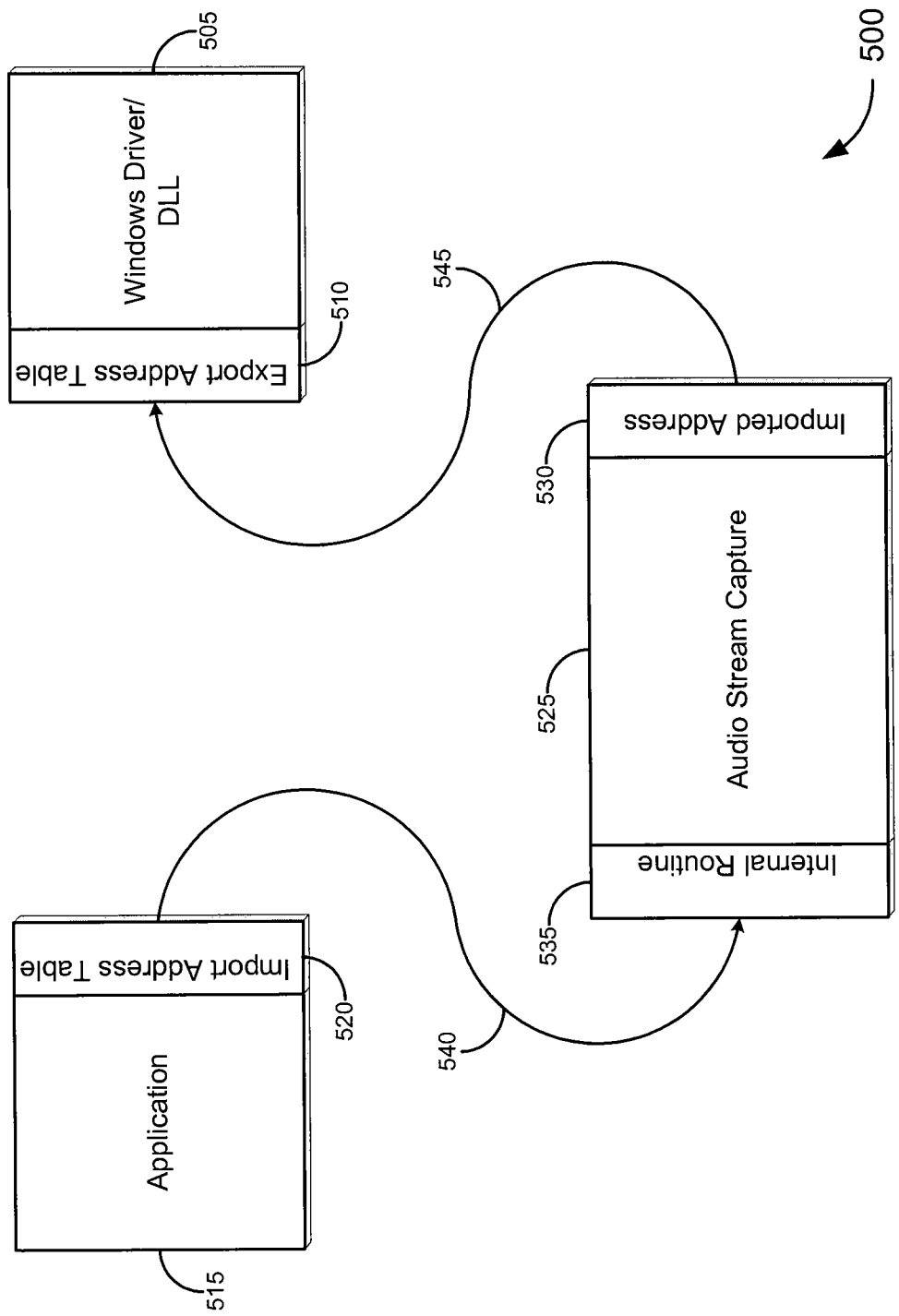
FIG. 5 is a functional diagram illustrating an API hook that may be utilized in accordance with various embodiments of the invention.
Figure 6:
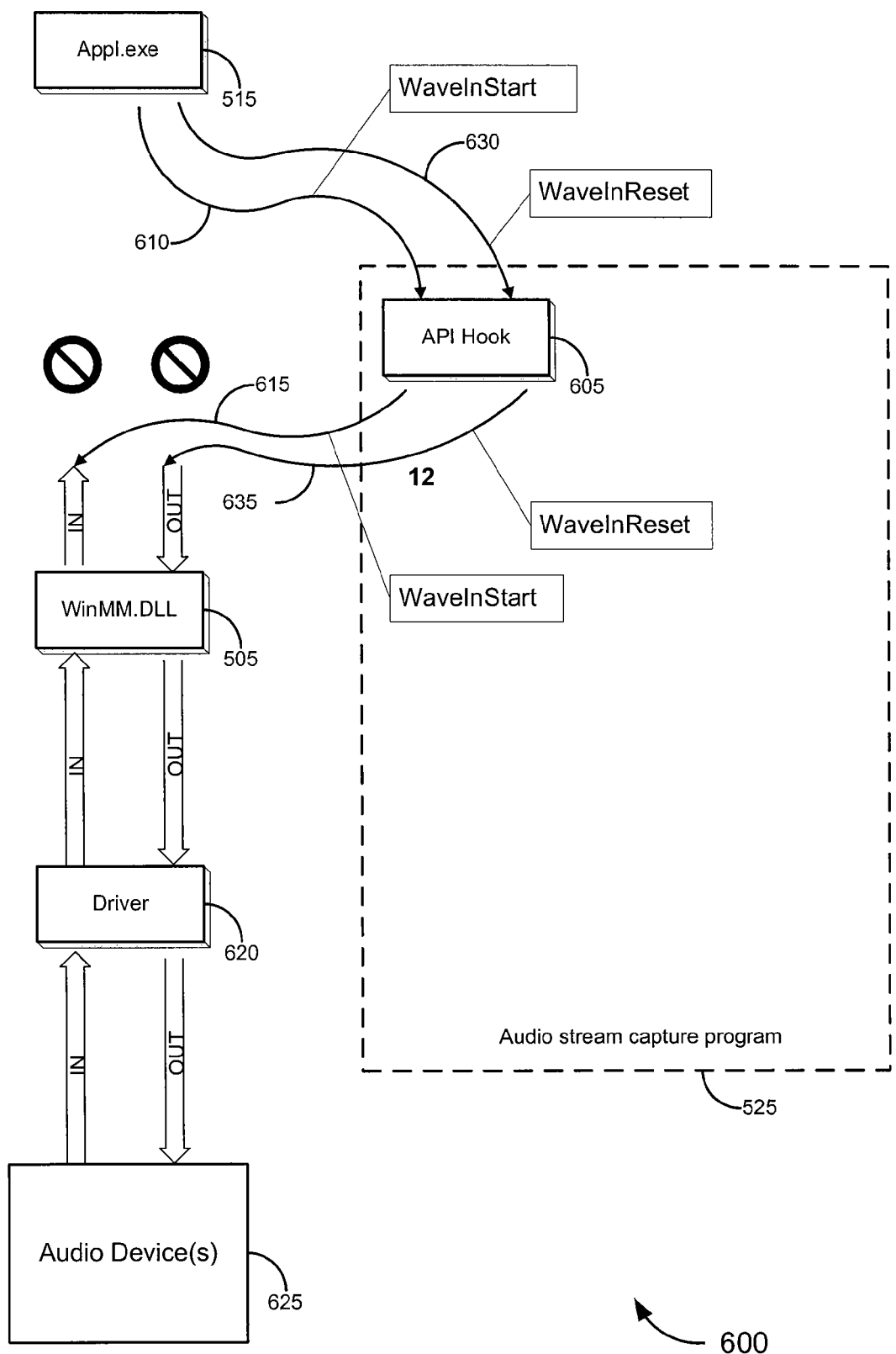
FIG. 6 illustrates the use of API functions to initiate an audio data capture procedure, in accordance with various embodiments of the invention.
Figure 7:
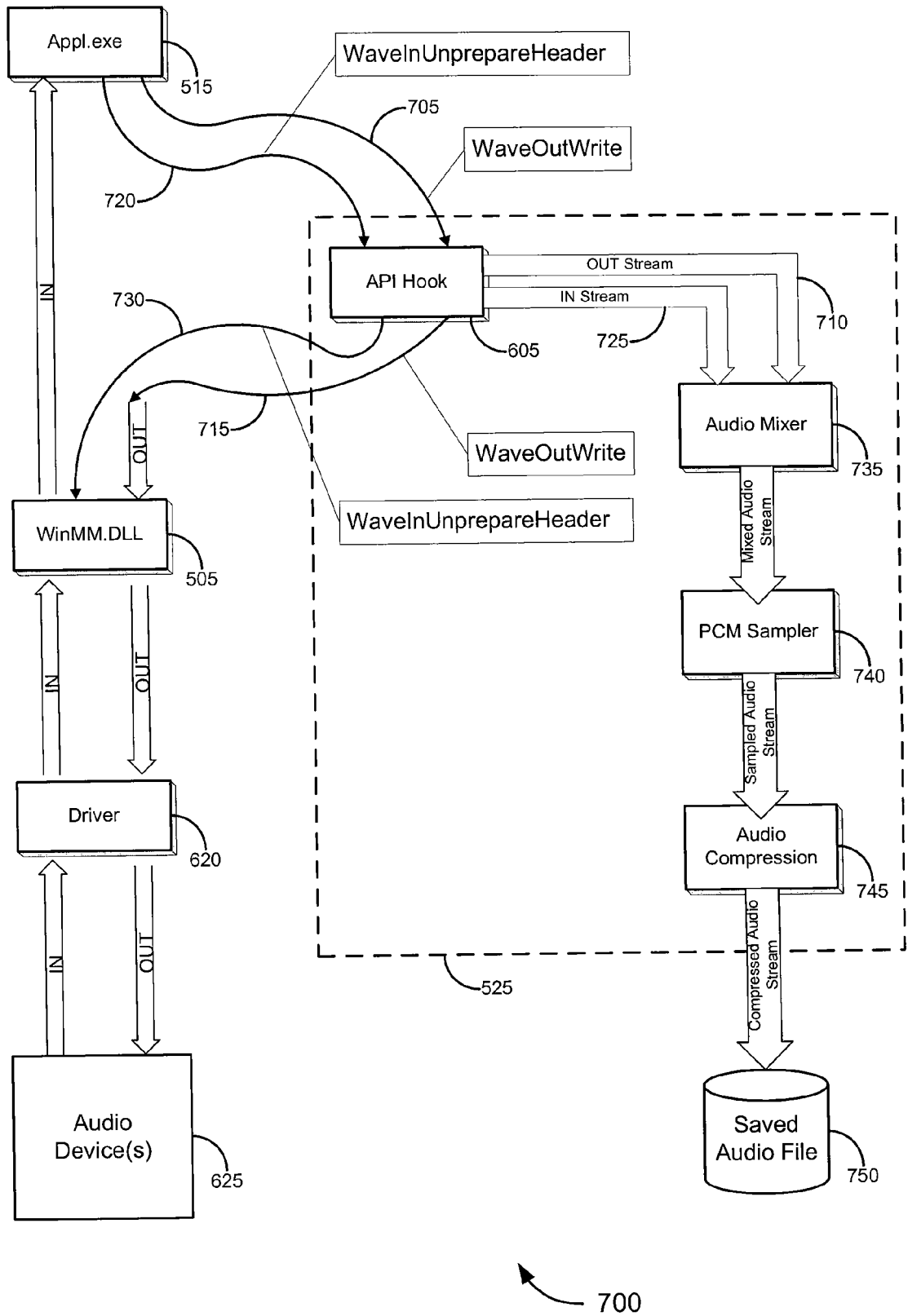
FIG. 7 illustrates the use of API functions to capture audio data, in accordance with various embodiments of the invention.

FIGS. 5-7 illustrate a particular set of embodiments that may be used on a computer running one of several varieties of the Microsoft Windows™ operating system. (One skilled in the art will appreciate, based on the disclosure herein, that similar embodiments may be used on other operating systems, perhaps with appropriate modifications to accommodate differences in the ways various operating systems handle audio function calls.) FIG. 5 illustrates how function calls may be intercepted in this environment. In some cases, the Windows™ operating system uses a standard Windows Multi Media dynamic link library ("dll") 505 that provides access to the audio functions installed on any Windows-operated computer. Any applications that wish to make use of the audio features installed on the computer generally must do so by using the API functions offered by the Windows Multi Media dll 505. In some versions of the Windows™ operating system, this dll is named "WinMM.dll."

The Windows Multi Media dll 505, which usually is shared by all audio-enabled applications, follows the Microsoft Portable Execution format, which is a published Microsoft standard format and interface. Each dll provides an Export Address Table 510 that is a list of externally available function names and their memory addresses within the dll where the called function should be passed control.

An application 515 wishing to make use of the functions within a dll similarly provides an Import Address Table 520, which contains a list of the names of the functions and the associated dll that it wishes to make use of. When the application is loaded, the Windows™ operating system will find and/or load the dll that contains the functions referenced by the application and will enter into the Import Address Table 520 of the application the memory address of each function call, retrieved from the Export Address Table 505 of the appropriate target dll (e.g., 505) that offers the function.

The audio stream capture program 525 (which might comprise one or more components, such as the audio stream capture component, of the monitoring software program described above) makes use of this well-known structure to insert itself between the application 515 and the Windows™ Multi Media dll 505. The audio stream capture program might locates the application program 515 that is to be monitored and/or the Import Address Table 520 within the application program 515, which, as noted above, uses the services provided by the Windows™ operating system for performing these functions.

The audio stream capture program 525 takes the target address for each Windows™ Multi Media dll (505) of interest called by the application 515 and saves that function call name and address as part of the Import Address Table 530 of the audio stream capture program 525. The audio stream program might then substitute in the Import Address Table 520 of the application 515 an address that references an equivalent internal routine 535 within the audio stream capture program 525.

Hence, when the application 515 makes a dll function call to the Windows™ Multi Media dll 505, the call 540 is first passed to the audio capture program 525, which, after processing the contents of the function call, passes (and/or propagates) the call 545 on to its original destination function in the Windows Multi Media dll 505. In a set of embodiments, some or all function and API call interceptions used for audio capture procedures are performed in this same manner, which referred to herein as an "API hook."

FIG. 6 illustrates how the audio stream capture program 525 is made aware that an audio-enabled application is about to use the audio capabilities, or has finished using them; in particular, FIG. 6 illustrates the first two API function calls that are intercepted; they are named WaveinStart and WaveIn-Reset in the Windows™ Multi Media dll 505.

WaveInStart is issued 610 by the audio-enabled application program 525 when the application is ready to start recording audio information; the function is used to signify. Because this function call has been intercepted using an API hook 605, the audio stream capture application 525 is able to prepare itself by allocating the necessary resources to start recording input audio and saving output audio streams. The details of how the audio input and output streams are captured and processed are described below.

The WaveInStart dll function call is then propagated 615 to the WinMM dll 505, which in turn calls the Windows audio drivers 620 to prepare the audio hardware system 625 (which might include one or more audio devices, such as sound cards/chipsets, microphones, speakers, etc.).

When the audio-enabled application program 515 wishes to finish using the audio sub-system and release resources, it calls the WaveInReset function 630, which is also the subject of an API hook 605.

Upon detection of the WinInReset function call, the audio stream capture program 525 will release its resources, and the WinInReset function call will be passed 625 to the WinMM dll 505 and down through the audio driver 620 to the installed sound sub-system 625. In some embodiments, because of the way the API hook 605 is inserted into the chain of function calls, neither the audio-enabled application 515 nor any of the operating system or hardware components need be aware of the intercept.

FIG. 7 illustrates how the audio capture program 525 captures and processes the input and output audio streams by intercepting the WaveOutWrite and the WaveInUnprepare-Header WinMM dll calls.

An API hook 605 is installed, as described above, for the WaveOutWrite and the WaveInUnprepareHeader function calls used by the audio-enabled application 515 to handle the output and input audio streams respectively.

First, referring to FIG. 7, we will describe how the output stream is intercepted and processed. The audio-enabled application 515 sends an output audio stream in buffers to the WinMM dll WaveOutWrite function call 705. The API hook 605 might intercept the function call and pass a copy 710 of the output audio buffer's contents on for audio processing. Following the intercept, the WaveOutWrite function call will be passed on 715 to the WinMM dll 505 and down the normal path to the audio sub-system 625.

In some embodiments, the input stream to the audio application 515 may be intercepted in a slightly different manner. When the audio-enabled application 515 wishes to receive an audio input stream from the WinMM dll 505 the application issues a WaveInPrepareHeader function call (not shown on FIG. 7) to the WinMM dll 505, which provides and prepares a buffer allocated inside the audio-enabled application 515, into which the input audio stream will be delivered. When the audio-enabled application 515 has finished processing the input audio stream, the WinMM.dll 505 normally requires the audio-enabled application 515 to make a WaveInUnprepare-Header function call 720 to WinMM dll 505, which then generally will release the buffer and/or permit its reuse. As part of the WaveInUnprepareHeader function call 720, the audio-enabled application 515 passes the address of the buffer allocated by the audio-enabled application 515. (Hence, in a set of embodiments, the WaveInPrepareHeader may serve as the initial function call described above, and/or interception of this call can provide the memory address where input audio data is stored.)

The API hook 605 thus may be configured to intercept the WaveInUnprepareHeader function call 715 and/or to access the input audio buffer, capture a copy of the contents of the buffer, and/or pass a copy those contents (e.g., input data 725) on to the audio capture application 525 for processing. Following the intercept, the WaveInUnprepareHeader function call may be passed on 730 to the WinMM dll 505, so as to allow the interaction between the audio application 515 and the WinMM dll 505 to proceed.

The audio out stream 710 and/or the audio in stream 725 may be passed into an audio mixer process 735 (which may be similar to the audio mixer component described above). In a particular set of embodiments, a Windows™ multimedia timer might be used to synchronize the two audio streams as they are processed by the audio mixer 735.

Following processing by the audio mixer 735, a mixed audio stream (which might be produced by the mixer 735 from the audio input data 710 and/or output 725 streams) may be passed into sampler 740, such as a pulse code modulated ("PCM") sampler process (to name but one example, which may be configured to sample the mixed audio stream at the rate required for input into an audio compression process 745. In a particular embodiment under Windows™, the audio processing will utilize available codecs, such as, for example, the True Speech™ or Fraunhoffer™ MP3 audio compression routines, to name but two examples. Such routines may exist on the client system and/or may be installed by embodiments of the invention.

Finally the compressed audio stream may be formatted using any standard and/or proprietary audio file format and/or saved on non-volatile storage 750. Optionally, the audio file may be transmitted (e.g., to a monitoring server) as described above, for analysis and/or replay.

Figure 8:
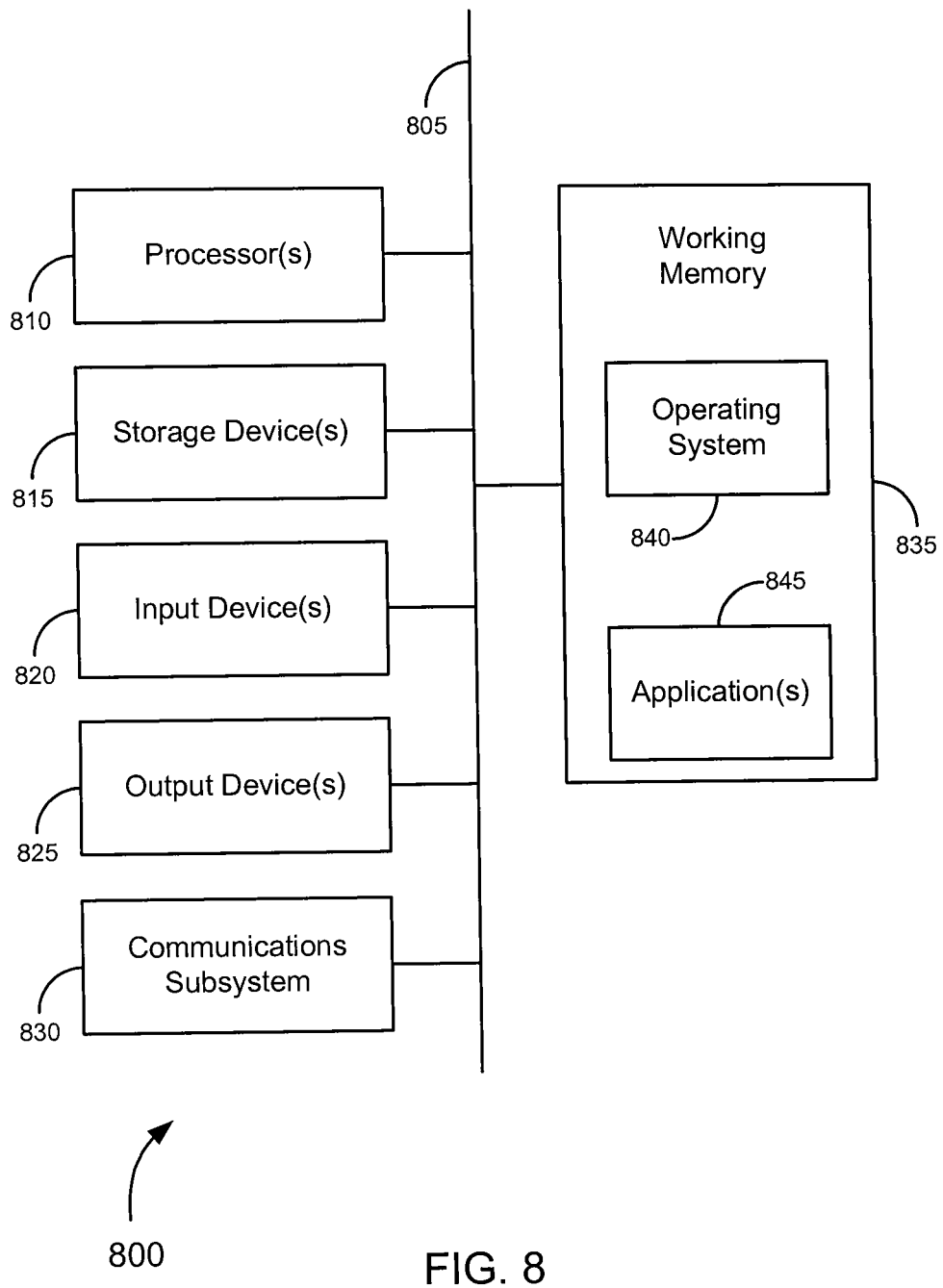
FIG. 8 is a generalized schematic diagram illustrating a computer architecture that may be used in accordance with various embodiments of the invention.

FIG. 8 provides a generalized schematic illustration of one embodiment of a computer system 800 that can perform the methods of the invention and/or the functions of computer, such as the monitored client computers and/or monitoring computers described above. FIG. 8 is meant only to provide a generalized illustration of various components, any of which may be utilized as appropriate. The computer system 800 can include hardware components that can be coupled electrically via a bus 805, including one or more processors 810; one or more storage devices 815, which can include without limitation a disk drive, an optical storage device, solid-state storage device such as a random access memory ("RAM") and/or a read-only memory ("ROM"), which can be programmable, flash-updateable and/or the like (and which can function as a data store, as described above). Also in communication with the bus 805 can be one or more input devices 820, which can include without limitation audio input devices (as described above, for example), a mouse, a keyboard and/or the like; one or more output devices 825, which can include without limitation audio output devices (as described above, for example), a display device, a printer and/or the like; and/or a communications subsystem 830; which can include without limitation a modem, a network card (wireless or wired), an infra-red communication device, and/or the like).

The computer system 800 also can comprise software elements, shown as being currently located within a working memory 835, including an operating system 840 and/or other code 845, such as an audio-enabled application program, various device drivers and/or dlls used by embodiments of the invention, and/or an application program as described above and/or designed to implement methods of the invention. Those skilled in the art will appreciate that substantial variations may be made in accordance with specific embodiments and/or requirements. For example, customized hardware might also be used, and/or particular elements might be implemented in hardware, software (including portable software, such as applets), or both.

While the invention has been described with respect to exemplary embodiments, one skilled in the art will recognize that numerous modifications are possible. For example, the methods and processes described herein may be implemented using hardware components, software components, and/or any combination thereof. Further, while various methods and processes described herein may be described with respect to particular structural and/or functional components for ease of description, methods of the invention are not limited to any particular structural and/or functional architecture but instead can be implemented on any suitable hardware, firmware and/or software configuration. Similarly, while various functionality is ascribed to certain system components, unless the context dictates otherwise, this functionality can be distributed among various other system components in accordance with different embodiments of the invention.

Moreover, while the procedures comprised in the methods and processes described herein are described in a particular order for ease of description, unless the context dictates otherwise, various procedures may be reordered, added, and/or omitted in accordance with various embodiments of the invention. Moreover, the procedures described with respect to one method or process may be incorporated within other described methods or processes; likewise, system components described according to a particular structural architecture and/or with respect to one system may be organized in alternative structural architectures and/or incorporated within other described systems. Hence, while various embodiments are described with—or without—certain features for ease of description and to illustrate exemplary features, the various components and/or features described herein with respect to a particular embodiment can be substituted, added and/or subtracted from among other described embodiments, unless the context dictates otherwise. Consequently, although the invention has been described with respect to exemplary embodiments, it will be appreciated that the invention is intended to cover all modifications and equivalents within the scope of the following claims.

What is claimed is:

1. A system for monitoring and collection of at least a portion of a voice conversation handled by a Voice over Internet Protocol ("VoIP") application the system comprising:

an audio stream capture component in operable communication with a computer system operably coupled to a communications network and further configured to monitor and capture at least a portion of a voice conversation that originates from or terminates at the computer system, wherein the computer system comprises a processor, a memory, an audio input device, an audio output device, a device driver providing an application programming interface ("API") for the audio input device and the audio output device, and a VoIP application for handling voice conversations using the computer system, and wherein the audio stream capture component comprises a first set of instructions executable by the processor, the first set of instructions operable when executed by a processor to perform operations comprising:

intercepting a first API function call from the VoIP application to the device driver, the first API function call indicating that the VoIP application has processed a first set of data at an audio input buffer configured to hold a first set of audio data received at the audio input device, the first set of data representing an audio input stream for the VoIP application, wherein the first set of data comprises a first set of raw data;

identifying, based at least in part on information contained in the first API function call, the location of the audio input buffer for the VoIP application;

capturing a copy of the first set of data stored in the audio input buffer before the first set of data is purged from the audio input buffer;

propagating the intercepted first API function call for reception by the device driver;

permitting the first set of raw data stored in the audio input buffer to be processed in accordance with at least the first API function call;

intercepting a second API function call from the VoIP application to the device driver, the second API function call comprising information about a second set of data representing an audio output stream from the VoIP application, wherein the second set of data corresponds to the output from the VoIP application and comprises a second set of raw data;

capturing a copy of the second set of data;

propagating the intercepted second API function call for reception by the device driver;

permitting the second set of raw data to be processed in accordance with at least the second API function call; and transmitting the captured copies of the first set of data and the second set of data for reception by an audio mixer component;

an audio mixer component in operable communication with the computer system, the audio mixer component comprising a second set of instructions executable by the processor, the second set of instructions operable when executed by the processor to perform operations comprising:

receiving the copy of the first set of data;

receiving the copy of the second set of data; and synchronizing the copy of the first set of data with the copy of the second set of data to re-create a voice conversation handled by the VOIP application; and an audio storage component in operable communication with the computer system, the audio storage component comprising a third set of instructions executable by the processor, the third set of instructions operable when executed by the processor to perform operations comprising:

compressing the re-created voice conversation;

saving the re-created voice conversation to a storage medium; and transmitting the re-created voice conversation for reception by a monitoring server.

2. The system as recited by claim 1, wherein:
the information about the second set of data comprises the second set of data: and
capturing the copy of the second set of data comprises capturing a copy of the second set of data from the API function call.

3. The system as recited by claim 1, wherein:
the information about the second set of data, in the second API function call, comprises information usable to identify the location of an audio output buffer for the VoIP application, the audio output buffer configured to hold audio data to be transmitted to the audio output device; and wherein
capturing the copy of the second set of data comprises capturing a copy of the second set of data from the audio output buffer.

4. A method for monitoring at least a portion of a voice conversation handled by an audio application executing on and providing audio services to a computer system in operable communication with a communications network, the computer system comprising a processor and a memory, the method comprising:
intercepting a first function call from the audio application to an application programming interface ("API") provided by a device driver for an audio device of the computer system, the first function call comprising information about an audio buffer storing a first set of data representing an audio stream handled by the audio application, wherein the audio stream corresponds to at least a portion of a voice conversation that either originates from or is received at the computer system, and wherein the first set of data comprises, if the audio stream originates at the computer system, raw data that is input to the audio application, and wherein the first set of data comprises, if the audio stream is received by the computer system, raw data for output from the audio application;
accessing, based at least in part on information referenced in the intercepted function call, the first set of data referenced by the API function call;
capturing a copy of the first set of data;
propagating the intercepted function call for reception by the API;
permitting the first set of raw data to be processed in accordance with at least the first API function call; and
re-creating the audio stream from the captured copy of the first set of data.

5. A method as recited by claim 4, the method further comprising: compressing the re-created audio stream.

6. A method as recited by claim 4, the method further comprising: saving the re-created audio stream to a storage medium.

7. A method as recited by claim 4, the method further comprising: transmitting the re-created audio stream for reception by a monitoring server.

8. A method as recited by claim 4, wherein the audio device comprises an audio input device.

9. The method as recited by claim 8, wherein the intercepted first function call informs the API that the audio application has processed the first set of data at an audio input buffer.

10. The method as recited by claim 9, the method further comprising:
identifying, based at least in part on the intercepted first function call, the audio input buffer for the audio application, the audio input buffer being configured to hold the first set of audio data received via the API from the audio input device.

11. The method as recited by claim 10, wherein capturing a copy of the first set of data comprises obtaining the first set of data from the audio input buffer before the first set of data is purged from the audio input buffer.

12. A method as recited by claim 11, wherein the audio device further comprises an audio output device, the method further comprising:
intercepting a second API function call from the audio application to the device driver, the second API function call comprising information about a second set of data representing an audio output stream from the audio application, the second set of data comprising raw data that is output from the audio application;
capturing a copy of the second set of data;
propagating the second function call for reception by the device driver; and
permitting the second set of raw data to be processed in accordance with at least the second function call.

13. The method as recited by claim 12, the method further comprising:
synchronizing the copy of the first set of data with copy of the second set of data to re-create an audio input-output stream handled by the audio application.

14. A method as recited by claim 13, wherein the audio input-output stream comprises at least one of an isochronous audio input-output stream and a Voice over Internet Protocol ("VoIP") conversation handled by the audio application.

15. A method as recited by claim 4, wherein the audio device comprises an audio output device.

16. A method as recited by claim 15, wherein the first API function call comprises the first set of data.

17. A method as recited by claim 15, wherein the first API function call comprises information usable to identify the location of an audio output buffer configured to store the first set of data.

18. A system for monitoring of at least a portion of a voice conversation handled by an audio application executing on a computer system that is in operable communication with a communications network, the computer system comprising a processor and a memory, the audio application receiving audio input and providing audio output, wherein the system for monitoring comprises:
a software application running on the computer system and configured to monitor an audio stream handled by the audio application, the audio stream corresponding to at least a portion of a voice conversation either originating from or terminating at the computer system, the software application comprising a set of instructions executable by the processor of the computer system, the set of instructions operable when executed by the processor to perform operations comprising:
intercepting a first application programming interface ("API") function call from the audio application to an audio appliances device driver of the computer system, the first function call referencing an audio input buffer storing a first set of data representing an audio input stream for the audio application, wherein the first set of data comprises a first set of raw data;
accessing the audio input buffer referenced by the first API function call;
capturing a copy of the first set of data stored in the audio input buffer;
propagating the intercepted first API function call for reception by the device driver;

permitting the first set of raw data stored in the audio input buffer to be processed in accordance with at least the first API function call;

intercepting a second API function call from the audio application to the audio appliances device driver, the second API function call referencing an audio output buffer storing a second set of data representing an audio output stream from the audio application, wherein the second set of data comprises a second set of raw data;

identifying, based at least in part on information referenced in the intercepted second API function call, the audio output buffer referenced by the second API function call;

capturing a copy of the second set of data stored in the audio output buffer;

propagating the intercepted second function call for reception by the device driver;

permitting the second set of data stored in the audio output buffer to be processed in accordance with at least the second API function call; and synchronizing the copy of the first set of data with the copy of the second set of data to re-create a set of audio input and output streams handled by the audio application.

19. A system as recited by claim 18, wherein the audio input and output streams are isochronous.

20. A system as recited by claim 18, wherein the software application further comprises:

instructions operable when executed by the processor to perform operations comprising identifying, based at least in part on information referenced in the intercepted first API function call, the audio input buffer for the audio application, the audio input buffer being configured to hold audio data received from an audio input device in operable communication with the computer system.

21. A system as recited by claim 18, further comprising intercepting an initialization API function call from the audio application to the audio appliances device driver, wherein the intercepted initialization API function call references a memory location of the audio input buffer.

22. A system as recited by claim 21, wherein the first API function call indicates that the audio application has processed a first set of data at the audio input buffer.

23. A system as recited by claim 22, wherein capturing a copy of the first set of data comprises obtaining a copy of the first set of data from the audio input buffer.

24. A system as recited by claim 18, wherein the software application further comprises:

instructions operable when executed by the processor to perform operations comprising identifying, based at least in part on information referenced in the intercepted second API function call, the audio output buffer for the audio application, the audio output buffer being configured to hold audio data to be provided to an audio output device in operable communication with the computer system.

25. A system as recited by claim 24, wherein capturing a copy of the second set of data comprises obtaining a copy of the second set of data from the audio output buffer for the audio application.

26. A system as recited by claim 18, wherein the software application comprises further instructions operable when executed by the processor to perform operations comprising compressing the re-created set of audio input and output streams.

27. A system as recited by claim 18, wherein the software application comprises further instructions operable when executed by the processor to perform operations comprising saving the re-created set of audio input and output streams to a storage medium.

28. A system as recited by claim 18, wherein the software application comprises further instructions operable when executed by the processor to perform operations comprising transmitting the re-created set of audio input and output streams for reception by a monitoring server.

29. A system as recited by claim 18, wherein the audio application is a Voice over Internet Protocol ("VoIP") application.

30. A system as recited by claim 18, wherein the re-created set of audio input and output streams comprises a Voice over Internet Protocol ("VoIP") conversation.

31. One or more non-transitory computer readable media storing logic for use on a computer system that is in operable communication with a communications network, the computer system comprising a processor and a memory, the logic, when executed by the processor, operable to provide an audio stream capture component configured to monitor at least a portion of a voice conversation that originates from or terminates at the computer system by perform operations comprising:

intercept a first API function call from an audio application running on the computer system to a device driver of the computer system, the audio application receiving audio input and providing audio output, the first API function call referencing an audio input buffer storing a first set of data representing an audio input stream for the audio application, wherein the audio input stream corresponds to at least a portion of a voice conversation that originates at the computer system, and wherein the first set of data comprises a first set of raw data that is input to the audio application;

accessing, based at least in part on information referenced in the intercepted first API function call, the audio input buffer referenced by the first API function call:

capturing a copy of the first set of data stored in the audio input buffer;

propagating the intercepted first API function call for reception by the device driver;

permitting the first set of raw data stored in the audio input buffer to be processed in accordance with at least the first API function call;

intercepting a second API function call from the audio application to the device driver, the second API function call referencing an audio output buffer storing a second set of data representing an audio output stream from the audio application, wherein the audio output stream corresponds to at least a portion of a voice conversation that is received at the computer system, and wherein the second set of data comprises a second set of raw data for output from the audio application;

accessing, based at least in part on information referenced in the intercepted second API function call, the audio output buffer referenced by the second API function call;

capturing a copy of the second set of data stored in the audio output buffer;

propagating the intercepted second function call for reception by the device driver;

permitting the second set of raw data to be processed in accordance with at least the second API function call; and synchronizing the copy of the first set of data with the copy of the second set of data to re-create a set of audio input and output streams handled by the audio application.

32. One or more non-transitory computer readable media storing logic for use on a computer system that is in operable communication with a communications network, the computer system comprising a processor and a memory, the logic, when executed by the processor, operable to provide an audio stream capture component configured to monitor at least a portion of a voice conversation that originates from or terminates at the computer system, by performing operations comprising:

intercepting an applications programming interface ("API") function call from an audio application running on the computer system to a device driver of the computer system, the API function call referencing an audio buffer storing a set of data representing an audio stream handled by the audio application, wherein the audio stream corresponds to at least a portion of a voice conversation that either originates from or is received at the computer system, and wherein the set of data comprises, if the audio stream originates at the audio device of the computer system, raw data that is input to the audio application, and wherein the set of data comprises, if the audio stream is received by the computer system, raw data for output from the audio application;

accessing, based at least in part on information referenced in the intercepted API function call, the audio buffer referenced by the API function call;

capturing a copy of the set of data stored in the audio buffer;

propagating the intercepted API function call for reception by the device driver;

permitting the set of raw data to be processed in accordance with at least the API function call; and re-creating the audio stream from the captured copy of the set of data.

33. A method for monitoring an audio stream handled by an audio application executing on a computer system, the audio stream corresponding to at least a portion of a voice conversation originating from or terminating at the computer system, the method comprising:

intercepting an application programming interface ("API") function call from the audio application to a device driver for an audio device of the computer system, the API function call comprising audio data handled by the audio application, wherein the audio data corresponds to at least a portion of a voice conversation that either originates from or is received at the computer system, and wherein the audio data comprises, if the audio data originates at the audio device of the computer system, raw data that is input to the audio application, and wherein the audio data comprises, if the audio data is received by the computer system, raw data for output from the audio application;

capturing a copy of the audio data from the API function call;

propagating the intercepted API function call for reception by the device driver;

permitting the raw data to be processed in accordance with at least the intercepted API function call; and re-creating the audio stream from the captured copy of the audio data.

34. The system of claim 1, wherein at least one of the first and second sets of raw data comprises at least one of:

(a) data that does not have a data protection scheme applied to it; and (b) unencrypted data.

\* \* \* \* \*